United States Patent Office  3,429,983
Patented Feb. 25, 1969

3,429,983
INSULATED POWER CABLES
Hermann Hofmeier, Dormagen, Germany, assignor to Farbenfabriken Bayer Aktiengesellschaft, Leverkusen, Germany, a German corporation
No Drawing. Filed Nov. 23, 1964, Ser. No. 413,325
Claims priority, application Germany, Nov. 27, 1963, F 41,382
U.S. Cl. 174—110    4 Claims
Int. Cl. H01b 3/42

This invention relates to insulated cables, particularly to high voltage cables in which the conductor is insulated with a polymeric material.

Heretofore electric cables have been manufactured with the conductor or conductors of the cable being covered by a layer of helically wrapped paper tape impregnated with a hydrocarbon oil. Despite the advantages which paper possesses as a convenient and inexpensive form of oil permeable material with which to form the solid dielectric of an oil impregnated high voltage cable, its use limits the maximum working voltage of such a cable for a given thickness of insulation.

Other materials, particularly polymeric materials, such as polyethylene, polyamides and polycarbonates have been employed as insulation for cables. However, they have one or more of the following disadvantages; namely, they do not have the necessary mechanical strength to withstand the abrasion encountered in the manufacture of the cable and/or they are easily attacked by insulating oils and moisture. Also, the di-electric constants and the loss angles are high and are greatly influenced by temperature within the operating range.

Therefore, it is an object of the present invention to provide a high voltage cable surrounded with an insulating material having high mechanical strength. Another object of this invention is to provide a high voltage cable surrounded by an insulating material which is resistant to insulating oils and other insulating liquids. Another object of this invention is to provide a high voltage cable surrounded with an insulating material having a lower angle and a lower dielectric constant than insulating materials heretofore employed. Still another object of this invention is to provide a cable surrounded with an insulating material wherein the electric breakup potential is extremely high. Still another object of the present invention is to provide an improved high voltage cable capable of being operated at higher voltages than conventional insulated high voltage cables without correspondingly increasing the thickness of the insulation and hence the bulk of the cable.

To achieve these and other objects, the solid dielectric component surrounding the high voltage cable is formed from partially crystallized polycarbonates. It has been found that polycarbonate materials, particularly polycarbonate films which are partially crystallized and stretched, at least in the longitudinal direction, have all the physical requirements found to be necessary for insulation on high voltage cables. The partially crystallized polycarbonate films are formed from a thermoplastic polycarbonate which has been stretched in a longitudinal direction at least double its original length. It is preferred that the polycarbonate have from about 20 to 60 percent crystalline content and more preferably from about 30 to 50 percent crystalline content.

These partially crystallized polycarbonates, particularly polycarbonate films, have higher resistance to permanent heat in the stretch state that the polycarbonates in the noncrystalline state. Also, they have very slight water absorption and are thus little permeable to water vapors. They have a high resistance to aging and are resistant to insulating oils and similar liquids. Furthermore, films prepared from partially crystallized polycarbonates have a lower loss angle and a lower dielectric constant than noncrystallized polycarbonate films.

In a preferred embodiment of the invention, a solid type single conductor lead-sheathed cable composed of a plurality of stranded metallic wires is surrounded throughout substantially its entire length by an insulating cover of a partially crystallized polycarbonate material. The partially crystallized polycarbonate material may be formed into a sheet and stretched in a longitudinal direction and helically wrapped about the conductor. The film may be formed into strips and applied preferably as a covering, with each turn of the strip substantially abutting, or with its edge spaced slightly from the adjoining edge of the adjacent turn rather than with overlapping of the adjoining turns.

It is also within the contemplation of this invention to from the solid dielectric component of the cable by wrapping about the conductor a film formed of substantially impervious sheets of partially crystallized polycarbonates and having at least one side formed with a multiplicity fo oil permeable channels extending thereacross from edge to edge. The oil permeable channels which may be of virtually any cross-section, are preferably formed at the same angle to the side edges of the film as the angle of lay at the film when it is helically wrapped about the conductor so that the channels in the cable insulation will extend longitudinally of the cable. They may be formed in any convenient manner, such as by cutting them into an originally ungrooved polycarbonate sheet or by impressing them during fabrication of the sheet. If desired, the film may be roughened in order to facilitate the flow of oil between the layers of film to prevent the inclusion of air. A number of layers of the film are helically wrapped about a conductor to form an insulating covering thereon. These channels or roughened areas will permit easy penetration of the insulating oil between successive layers of the wrapping and hence make possible effective impregnation of the cable insulaion structure by the liquid dielectric material. Alternating layers of smooth and embossed films may be used.

Any suitable crystallizable, high molecular weight polycarbonate may be used as insulating material, including most polycarbonates prepared in accordance with the process disclosed in Canadian Patent 578,585.

The polycarbonates may be produced from a great number of dihydroxy compounds, that is, of aliphatic, cycloaliphatic and aromatic dihydroxy compounds. For example, there may be mentioned as aliphatic dihydroxy compounds, ethylene glycol, diethylene glycol, triethylene glycol, polyethylene glycol, thiodiglycol, ethylenethiodiglycol. The di- and polyglycols produced from propylene oxide-1, 2, ortho, meta, or paraxylylene glycol; propanediol-1,3; butanediol-1,3; butanediol-1,4; 2-methylpropanediol-1,3; pentanediol-1,5; 2-ethylpropanediol-1,3; hexanediol-1,6; octanediol-1,8; 1-ethylhexanediol-1,3, and decanediol-1,10.

As cycloaliphatic dihydroxy compounds are, for example, cyclohexanediol-1,4; cyclohexanediol-1,2; 2,2-(4-,4'-dihydroxy-dicyclohexylene)propane and 2,6-dihydroxy-decahydronaphthalene. Examples of aromatic dihydroxy compounds are hydroquinone, resorcinol, 4,4'-dihydroxydiphenyl, 2,2'-dihydroxydiphenyl, 1,4-dihydroxynaphthalene, 1,6-dihydroxynaphthalene.

A preferred class of aromatic dihydroxy compounds which may be employed are the dimonohydroxyarylene sulphones and the dimonohydroxyarylene alkanes, such as, 4,4'-dihydroxydiphenylene sulphone,
2,2-dihydroxydiphenylene sulphone,
3,3'-dihydroxydiphenylene sulphone,
4,4'-dihydroxy-2,2'-dimethyldiphenylene sulphone, 4,4'-dihydroxy-3,3'-dimethyldiphenylene sulphone,
2,2'-dihydroxy-4,4'-dimethyldiphenylene sulphone,
4,4'-dihydroxy-2,2'-diethyldiphenylene sulphone,
4,4'-dihydroxy-3,3'-diethyldiphenylene sulphone,
4,4'-dihydroxy-2,2'-di-tert. butyl-diphenylene sulphone,
4,4'-dihydroxy-3,3'-di-tert. butyl-diphenylene sulphone,
2,2'-dihydroxy-1,1'-dinaphthylene sulphone,
4,4'-dihydroxydiphenylenemethane, 1,1-(4,4'dihydroxy-diphenylene)ethane,
1,1-(4,4'-dihydroxydiphenylene)-propane,
1,1-(4,4'-dihydroxydiphenylene)butane,
1,1-(4,4'-dihydroxydiphenylene)-2-methyl-propane,
1,1-(4,4'-dihydroxydiphenylene)heptane,
1,1-(4,4'-dihydroxydiphenylene-1-phenylmethane,
(4,4'dihydroxydiphenylene)-(4-methyl-phenylene)methane,
(4,4'-dihydroxydiphenylene)-(4-ethyl-phenylene)-methane,
(4,4'-dihydroxydiphenylene)-(4-isopropyl-phenylene)methane,
(4,4'-dihydroxydiphenylene)-(4-butyl-phenylene)methane,
(4,4'-dihydroxydiphenylene)benzyl-methane,
(4,4'-dihydroxydiphenylene)-alpha-furyl-methane,
2,2-(4,4'-dihydroxydiphenylene)propane,
2,2-(4,4'-dihydroxydiphenylene)butane,
2,2-(4,4'-dihydroxydiphenylene)pentane (melting point 149–150° C.),
2,2-(4,4'-dihydroxydiphenylene)-4-methyl-pentane,
2,2-(4,4'-dihydroxydiphenylene)heptane (boiling point 198–200° C. under 0.3 mm. mercury gauge),
2,2-(4,4'-dihydroxydiphenylene)octane,
2,2-(4,4'-dihydroxydiphenylene)nonane (melting point 68° C.),
1,1-(4,4'-dihydroxydiphenylene)-1-phenylethane,
(4,4'-dihydroxydiphenylene)-1-(alpha-furyl)ethane,
3,3-(4,4'-dihydroxydiphenylene)pentane,
4,4-(4,4'-dihydroxydiphenylene)heptane,
1,1-(4,4'-dihydroxydiphenylene)cyclopentane,
1,1-(4,4'-dihydroxydiphenylene)cyclohexane,
2,2-(4,4'-dihydroxydiphenylene)decahydronaphthalene,
2,2-(4,4'-dihydroxy-3,3'-dicyclohexyldiphenylene)-propane,
2,2-(4,4'-dihydroxy-3-methyldiphenylene)propane,
2,2-(4,4'-dihydroxy-3-isopropyl-diphenylene)butane,
1,1-(4,4'-dihydroxy-3,3'-dimethyldiphenylene)-cyclohexane,
2,2-(4,4'-dihydroxy-3,3'-dibutyldiphenylene)propane,
2,2-(4,4'-dihydroxy-3,3'-diphenyldiphenylene)-propane,
2,2-(4,4'-dihydroxy-2,2'-dimethyldiphenylene)propane,
1,1-(4,4'-dihydroxy-3,3'-dimethyl-6,6'-dibutyl-diphenylene)butane,
1,1-(4,4'-dihydroxy-3,3'-dimethyl-6,6'-ditert. butyl-diphenylene)ethane,
1,1-(4,4'-dihydroxy-3,3'-dimethyl-6,6-di-tert. butyl-diphenylene)propane,
1,1-(4,4'-dihydroxy-3,3'-dimethyl-6,6'-di-tert. butyl-diphenylene)butane,
1,1-(4,4'-dihydroxy-3,3'-dimethyl-6,6'-di-tert. butyl-diphenylene)isobutane,
1,1-(4,4'-dihydroxy-3,3'-dimethyl-6,6'-di-tert. butyl-diphenylene)heptane,
1,1-(4,4'dihydroxy-3,3'-dimethyl-6,6'-di-tert. butyl-diphenylene)-1-phenyl-methane,
1,1-(4,4'-dihydroxy-3,3'-dimethyl-6,6'-di-tert. butyl-diphenylene)-2-methyl-2-pentane,
1,1-(4,4'-dihydroxy-3,3'-dimethyl-6,6'-di-tert( butyl-diphenylene)-2-ethyl-2-hexane, and
1,1-(4,4'-dihydroxy)-3,3'-dimethyl-6,6'-di-tert. amyl-diphenylene)butane.

Among the great number of suitable dimonohydroxy arylene alkanes the 4,4'-dihydroxydiphenylene alkanes are preferred, especially the 2,2-(4,4'-dihydroxydiphenylene)-propane and the 1,1-(4,4'-dihydroxydiphenylene)cyclohexane.

In some cases mixed polycarbonates prepared from at least two different dihydroxy compounds, such as, at least one aromatic and at least one aliphatic dihydroxy compound yield films having desirable properties.

The polycarbonates may be prepared by several different processes, for example, they may be prepared by the introduction of phosgene into solutions of dihydroxy compounds or of mixtures of the aforesaid dihydroxy compounds in organic bases such as dimethylaniline, diethylaniline, trimethylamine and pyridine or in different organic solvents such as petrol, ligroin, cyclohexane, methylcyclohexane, benzene, toluene, xylene, chloroform, methylene chloride, carbon tetrachloride, trichloroethylene, dichloroethane, methyl acetate and ethyl acetate, with addition of an acid binding agent, e.g., tertiary amines. A process particularly suitable for producing polycarbonates consists in introducing phosgene into the aqueous solution or a suspension of alkali or alkaline earth metal salts, such as, lithium, sodium, potassium and calcium salts with a dihydroxy compound, preferably in the presence of an excess of a base such as lithium, sodium, potassium, calcium hydroxide or carbonate. The polycarbonate then precipitates out from the aqueous solution.

The conversion in the aqueous solution is promoted by the addition of inert solvents of the kind mentioned above which are capable of dissolving phosgene and eventually the produced polycarbonate.

It is also possible to react bis-chlorocarbonates of di-hydroxy compounds, with the aforementioned dihydroxy compounds. The condensation proceeds suitably in the presence of inert solvents, and acid-binding agents, e.g., tertiary amines.

In using phosgene or bis-chlorocarbonic acid esters as derivatives of the carbonic acid in producing polycarbonates, it may be advantageous to use catalysts. Such catalysts are, for example, tertiary or quaternary organic bases or salts thereof, such as trimethylamine, triethylamine, dimethylaniline, diethylaniline, dimethylcyclohexylamine, and pyridine, or for instance, the corresponding hydrochlorides in amounts from about 0.05 to about 5 percent by weight.

In some cases, it may be preferable to add surface active agents, such as, alkali metal salts of higher fatty acids or of sulphonic acids of higher aliphatic or of aromatic hydrocarbons and polyoxyethylated alcohols and phenols.

The reaction conditions for producing the polycarbonates are not critical, however, it is preferred that the phosgene react with the dihydroxyl compounds in a 1:1 mol ratio. Suitable temperatures are from about 0° C. to about 320° C.

Partially crystalline polycarbonate films may be prepared by any suitable method known to the art per se. For example, the method disclosed in U.S. patent application Ser. No. 708,740, filed Jan. 1, 1958, by Prietzschk et al., now abandoned. The polycarbonate may be dissolved in an organic solvent, and cast therefrom as a film.

It has been found that an improved result is obtained if the polycarbonate film having a characteristic value of 1.67 as determined by the method of Prietzschk, is prepared for stretching by casting it from a polycarbonate solution in a mixture of a good solvent for the polycarbonate and a solvent which is a relatively poor and/or non-solvent for the polycarbonate. It is preferred that the poor or non-solvent be less volatile than the solvent under the operating conditions and have a relatively high boiling point. Polycarbonate articles which are obtained from solutions employing only a good solvent of low boiling point such as, for example, methylene chloride, have a degree of crystallization which corresponds to the characteristic value of not higher than about 1.60, but their physical properties are not improved by stretching. On the contrary, when a mixture of good and relatively poor and/or nonsolvents are used with a polycarbonate, the crystallization characteristics value of the product is higher than about 1.67. The stretched product has a shape fiber diagram and improved physical characteristics. Any suitable solvent mixture may be employed in forming the film, such as, for example, a mixture of a good solvent such as methylene chloride, chloroform and the like, with a relatively poor and/or non-solvent such as, for example, halogenated hydrocarbons including ethylene chloride and trichloroethylene, aromatic hydrocarbons including benzene and toluene, aliphatic hydrocarbons including hexane and heptane; ketones including acetone, methylethylketone, and diisopropylketone esters including ethyl acetate, ethers including diisopropyl ether and dibutyl ether and the like. For best results, it was found that the solvent mixture should contain more of the good solvent than the poor solvent.

When casting the film from a polycarbonate solution, the process should be carried out in an atmosphere as dry as possible to prevent the film from becoming opaque.

The stretching of the polycarbonate film can be effected by the conventional methods, however, it must be stretched while it is at a temperature within the range of from about 100° C. to about 250° C. and more preferably while the film is at a temperature within a range of from about 150° C. to about 220° C. The stretching ratio depends on the polycarbonate and is generally between 1:2 and 1:12, preferably between 1:3 and 1:5.

In determining the ratio of the degree of crystallization of the amorphous material of the polycarbonate, the method disclosed by A. Prietzschk, Kolloidzeitschrift 156 (1958), page 8, may be employed. In accordance with that method, the ratio of the degree of crystallization to the amorphous material of the polycarbonate is divided by the reflex breadth and the resulting number is multiplied by ten to obtain the characteristic value. The formula for this calculation is as follows:

$$\frac{Crystalline/amorphous}{Reflex\ breadth} \times 10 \text{ is equal to the characteristic value.}$$

The molecular weight of the polycarbonates to be used according to the invention are in the same range as those of all film forming polymers. Polycarbonates with molecular weights from 100 to 150,000, particularly from 200 to 100,000 are preferred.

The thickness of the film employed herein is not critical. However, it is preferred that the film have a thickness of from about .01 to about 0.5 mm. and more preferable from about 0.01 to about 0.1 mm. In preparing the solution which was then stretched to about 3.5 times its unstretched length at a temperature of about 250° C. A strip of the poly[2,2-bis(4-hydroxyphenyl)propane carbonate] film having a crystalline content of 40% was wrapped around the conductor of a high voltage cable.

EXAMPLE 2

A solution of the polycarbonate from 2,2-(4,4'-dihydroxydiphenyl)propane is cast to yield a film of a thickness of about 0.1 mm. This film was stretched on a copper block heated to 170° C. with a velocity of about 0.5 meter per minute, the film being drawn over the corner of the block.

The film was stretched to 2.5 times its original length. With the ratio of stretch of 1:2.5 the film has a breaking load of 3700 kilograms per $cm.^2$.

A strip of the polycarbonate film, which showed a highly oriented crystal diagram upon X-ray examination, was wrapped around the conductor of a high voltage cable.

EXAMPLE 3

Another film from the same polycarbonate of Example 2 having a thickness of 0.03 mm. was stretched at a ratio of 1:7.3 under the same conditions. The film had a breaking load of 4330 kilograms per $cm.^2$ and an elongation at break of 28 percent. The film stretched in this manner showed a highly oriented crystal diagram upon X-ray examination. A strip of this film was used in wrapping the conductor of a high voltage cable.

The following table illustrates the effect of temperature on the dielectric constant, the insulation resistance and loss angle of a partially crystallized polycarbonate film.

TABLE I

| Temperature in ° C. | 20 | 60 | 100 |
|---|---|---|---|
| Loss Angle (tg $\delta \times 10^4$) 50 c./sec. | 8 | 5 | 4 |
| Dielectric Constant ($\epsilon r$) 50 c./sec. | 2.74 | 2.73 | 2.72 |
| Resistance ($\rho D$) | $3.10^{17}$ | $2.10^{17}$ | $7.10^{16}$ Ω cm. |

The data depicted in Table I illustrates the dielectric constant, insulation resistance and the loss angle of a partially crystallized polycarbonate as a function of temperature. The insulating quality of the polycarbonate is directly related to its dielectric strength and inversely related to its loss factor.

In addition, the dielectric constants of the partially crystallized polycarbonate film are generally close to the dielectric constants of the common liquid dielectric materials, so that the resultant film is considerably more homogeneous than other oil-polymeric insulating materials.

Table II compares the physical properties of a partially crystallized polycarbonate with that of a noncrystalline polycarbonate.

TABLE II

| Polycarbonate | Loss Angle, tg $\delta \times 10^4$, 50 c./sec. | Dielectric Constant, $\epsilon r$, 50 c./sec. | Tensile Strength, kp./mm.$^2$ | Modulus of Elasticity, kp./cm.$^2$ |
|---|---|---|---|---|
| Poly[2,2-bis(4-hydroxyphenyl)carbonate]: | | | | |
| Crystallized and longitudinally stretched film | 8 | 2.74 | 22–28 | 350,000 |
| Noncrystalline casting film | 25 | 3.1 | 8–9 | 220,000 | layers of the cable, film having different thickness may be used.

The present invention is further disclosed in the following examples which are illustrative but not limitative thereof.

EXAMPLE 1

A series of films were prepared from a polycarbonate which had been prepared by reacting 2,2-bis(4-hydroxyphenylpropane with phosgene. The process followed in preparing the polycarbonate is described in Canadian Patent 578,585. A solution of this polycarbonate was prepared by dissolving about 20% by weight in a suitable solvent in the unstretched film obtained by casting the Analysis of the data of Table II shows that noncrystalline polycarbonate has a loss angle more than three times greater than a partially crystallized and longitudinally stretched polycarbonate film. Also the dielectric constant of the partially crystallized polycarbonate film is substantially below that of the noncrystalline polycarbonate material. It will be observed that the tensile strength of a partially crystallized polycarbonate, especially those stretched in a longitudinal direction, is about three times greater than the noncrystalline polycarbonate and that the modulus of elasticity of a partially crystallized polycarbonate is more than 1.5 times that of the noncrystalline polycarbonate. Also the partially crystallized polycarbonate has a further advantage, in that the dielectric value is close to the dielectric values of most insulating fluids.

Even though the present invention provides for a polycarbonate film having from 20 to 60 percent crystalline structure, any partially crystallized polycarbonate film is adaptable as insulating material for cables.

Various types of insulating oils may be employed in the high voltage cables of this invention. Generally, these insulating oils are either hydrocarbon oils isolated from petroleum distillates, such as, naphthenic-base mineral oil, or they are prepared from synthetic dielectric fluids, such as the silicon oils or organosilicon fluids. When a hydrocarbon oil is used, it may be blended with a purified rosin or with a high molecular weight polymer. The unblended naphthenic-base mineral oils are preferred, since they are more resistant to decomposition and have better dielectric properties than the blended oils.

Satisfactory results have been obtained by using a synthetic silicone fluid, such as polysiloxanes, polysilanes, and polysilicate esters, all of which have excellent dielectric properties.

Although the invention has been described in considerable detail for the purpose of illustration, it is to be understood that variations may be made therein by those skilled in the art without departing from the spirit of the invention and the scope of the claims.

What is claimed is:

1. An electric power cable comprising a conductor surrounded by a dielectric coating of a partially crystallized polycarbonate film, said partially crystallized polycarbonate film having a crystalline content of at least 20 percent.

2. The dielectric coating of claim 1 wherein the polycarbonate film is poly[2,2-bis(4-hydroxyphenyl)alkyl carbonate].

3. The dielectric coating of claim 1 wherein the polycarbonate has a crystalline content of from 30 to 50 percent.

4. The dielectric coating of claim 1 wherein the polycarbonate is based on 2,2-bis(4-hydroxyphenyl)propane.

References Cited

UNITED STATES PATENTS

| | | | |
|---|---|---|---|
| 2,556,295 | 6/1951 | Pace | 264—95 |
| 2,789,967 | 4/1957 | Reynolds et al. | 260—77.5 |
| 3,105,872 | 10/1963 | Thompson et al. | 174—120 |
| 3,214,500 | 10/1965 | Maerov et al. | 260—47 |
| 3,327,033 | 6/1967 | Koch et al. | 264—83 |

FOREIGN PATENTS

| | | |
|---|---|---|
| 772,627 | 4/1957 | Great Britain. |
| 870,095 | 6/1961 | Great Britain. |

EARL M. BERGERT, *Primary Examiner.*

T. R. SAVOIE, *Assistant Examiner.*

U.S. Cl. X.R.

174—25, 120; 156—53